(12) United States Patent
Izawa et al.

(10) Patent No.: US 12,546,830 B2
(45) Date of Patent: Feb. 10, 2026

(54) VOLTAGE DETECTION DEVICE AND BATTERY MODULE

(71) Applicant: AESC Japan Ltd., Kanagawa (JP)

(72) Inventors: Takami Izawa, Kanagawa (JP); Ryuichi Amagai, Kanagawa (JP); Masayuki Nakai, Kanagawa (JP); Shinkichi Toyosaki, Kanagawa (JP); Yasuhiro Yanagihara, Kanagawa (JP)

(73) Assignee: AESC Japan Ltd., Kanagawa (JP)

( * ) Notice: Subject to any disclaimer, the term of this patent is extended or adjusted under 35 U.S.C. 154(b) by 594 days.

(21) Appl. No.: 17/935,388

(22) Filed: Sep. 26, 2022

(65) Prior Publication Data

US 2023/0095455 A1    Mar. 30, 2023

(30) Foreign Application Priority Data

Sep. 29, 2021    (JP) .................... 2021-159630

(51) Int. Cl.
*G01R 31/3835* (2019.01)
*G01R 31/364* (2019.01)
*H01M 10/48* (2006.01)
*H01M 50/531* (2021.01)

(52) U.S. Cl.
CPC ....... *G01R 31/3835* (2019.01); *G01R 31/364* (2019.01); *H01M 10/482* (2013.01); *H01M 50/531* (2021.01)

(58) Field of Classification Search
CPC ............ G01R 31/3835; G01R 31/364; H01M 50/531; H01M 50/50; H01M 50/59; H01M 50/591; H01M 50/593; H01M 10/482
See application file for complete search history.

(56) References Cited

U.S. PATENT DOCUMENTS

| | | | |
|---|---|---|---|
| 9,097,771 B2 | 8/2015 | Lee et al. | |
| 2013/0330584 A1 | 12/2013 | Lee et al. | |
| 2014/0220420 A1 | 8/2014 | Yoshioka et al. | |
| 2020/0127337 A1* | 4/2020 | Kim ................. | H01M 10/4235 |
| 2021/0194101 A1 | 6/2021 | Kim et al. | |

FOREIGN PATENT DOCUMENTS

| | | |
|---|---|---|
| JP | 2013-033635 A | 2/2013 |
| JP | 2014-516457 A | 7/2014 |
| JP | 2015-111537 A | 6/2015 |
| JP | 2017-084465 A | 5/2017 |
| JP | 2020-047435 A | 3/2020 |
| JP | 2020-087721 A | 6/2020 |
| KR | 1020160094909 | * 8/2016 |

OTHER PUBLICATIONS

JP2017084465 English translation. Nakai. Japan. May 18, 2017. (Year: 2017).*
KR1020160094909 English translation. Eom et al. Korea. Aug. 10, 2016. (Year: 2016).*

* cited by examiner

*Primary Examiner* — Christopher P Domone
(74) *Attorney, Agent, or Firm* — Studebaker Brackett PLLC (57) ABSTRACT

A first voltage detection device includes a plurality of first voltage detection portions connected to a plurality of lead portions of a plurality of battery cells, a first holding body holding the plurality of first voltage detection portions, and an insulator provided at the first holding body, at least a portion of the insulator being located between the different lead portions.

20 Claims, 6 Drawing Sheets

VOLTAGE DETECTION DEVICE AND BATTERY MODULE

This application is based on Japanese patent application NO. 2021-159630, filed on Sep. 29, 2021, the content of which is incorporated hereinto by reference.

BACKGROUND

Technical Field

The present invention relates to a voltage detection device and a battery module.

Related Art

A battery module such as a lithium-ion secondary battery may include a plurality of stacked battery cells. In such a battery module, the plurality of battery cells are electrically connected to each other by positive electrode leads and negative electrode leads drawn from an exterior material of the battery cells.

Japanese Laid-open Patent Publication No. 2020-47435 discloses an example of a battery module. In the battery module, a positive electrode lead of one battery cell and a negative electrode lead of another battery cell are bonded to each other. Thus, the one battery cell and the other battery cell are electrically connected to each other via lead portions including the positive electrode lead and the negative electrode lead bonded to each other.

Japanese Laid-open Patent Publication No. 2017-84465 and PCT Japanese Translation Patent Publication No. 2014-516457 discloses examples of a battery module. In the battery module, a positive electrode lead of one battery cell and a negative electrode lead of another battery cell are electrically connected to each other via a bus bar.

Japanese Laid-open Patent Publication No. 2020-87721 discloses an example of a battery module. In the battery module, a positive electrode fastening terminal welded to a positive electrode lead of one battery cell and a negative electrode fastening terminal welded to a negative electrode lead of another battery cell are electrically connected to each other.

SUMMARY

For example, as disclosed in Japanese Laid-open Patent Publication No. 2020-47435, when one battery cell and another battery cell are bonded to each other via lead portions, electrical insulation may not be secured between different lead portions. For example, when the battery module receives a large impact, the lead portion may be deformed. In this case, the adjacent lead portions may come into contact with each other, and thus a short circuit between the adjacent lead portions may occur.

An example of an object of the present invention is to secure electrical insulation between different lead portions. Other objects of the invention will become apparent from the description of the present specification.

One aspect of the present invention is a voltage detection device. The voltage detection device includes a plurality of voltage detection portions connected to a plurality of lead portions of a plurality of battery cells, a holding body holding the plurality of voltage detection portions, and an insulator provided at the holding body, at least a portion of the insulator being located between the different lead portions.

Another aspect of the present invention is a battery module. The battery module includes the voltage detection device, and the plurality of battery cells including the plurality of lead portions electrically connected to the plurality of voltage detection portions.

According to the above aspect, electrical insulation can be secured between different lead portions.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, an embodiment of the present invention will be described with reference to the drawings. In all drawings, similar components are denoted by the similar reference signs, and description thereof will not be repeated.

In the present specification, ordinal numbers such as "first", "second", and "third" are added in order to simply distinguish components having similar names unless otherwise specified, and do not mean the particular feature of the component (for example, order or importance).

Figure 1:
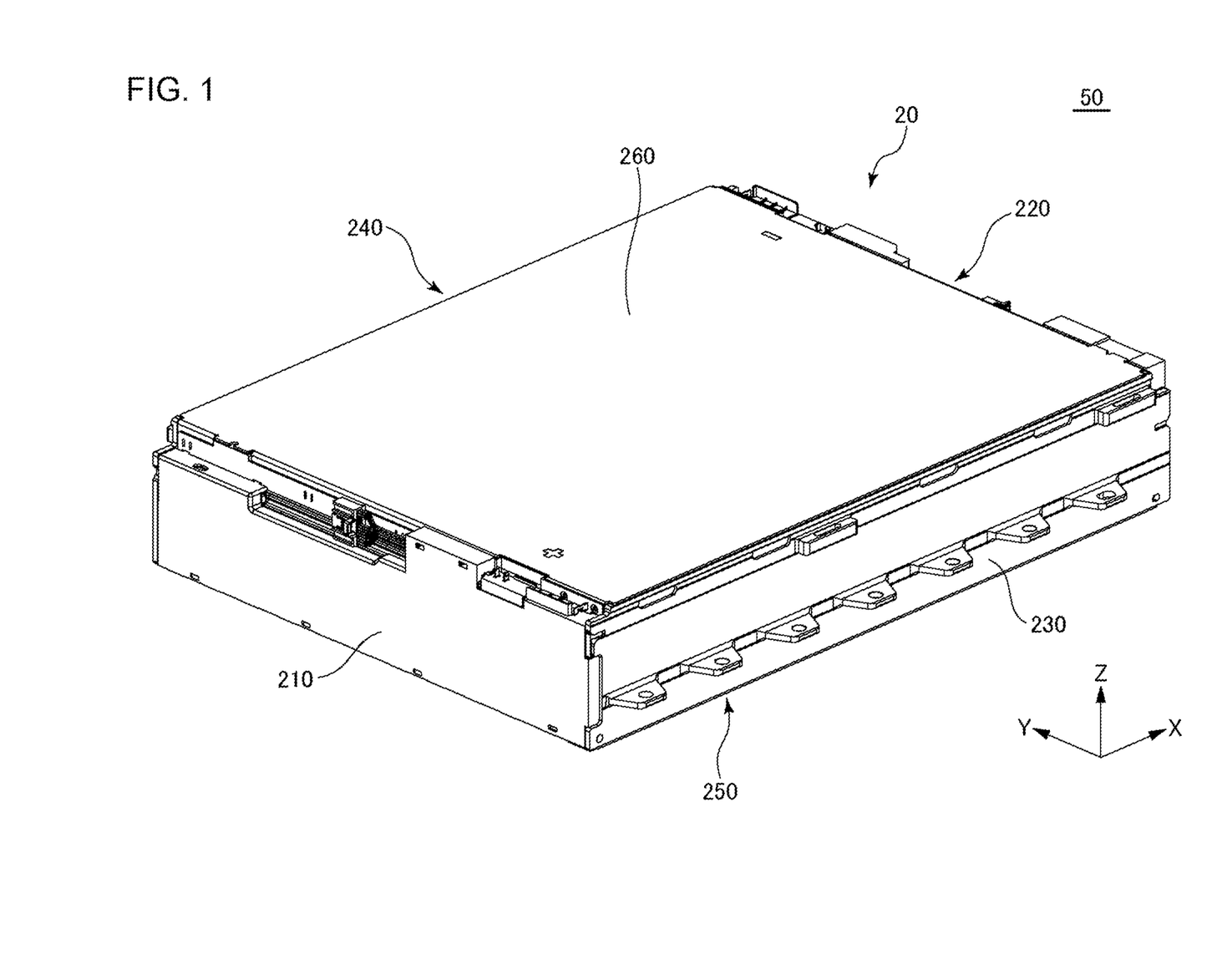
FIG. 1 is a perspective view of a battery module according to an embodiment when viewed from the front.
Figure 2:
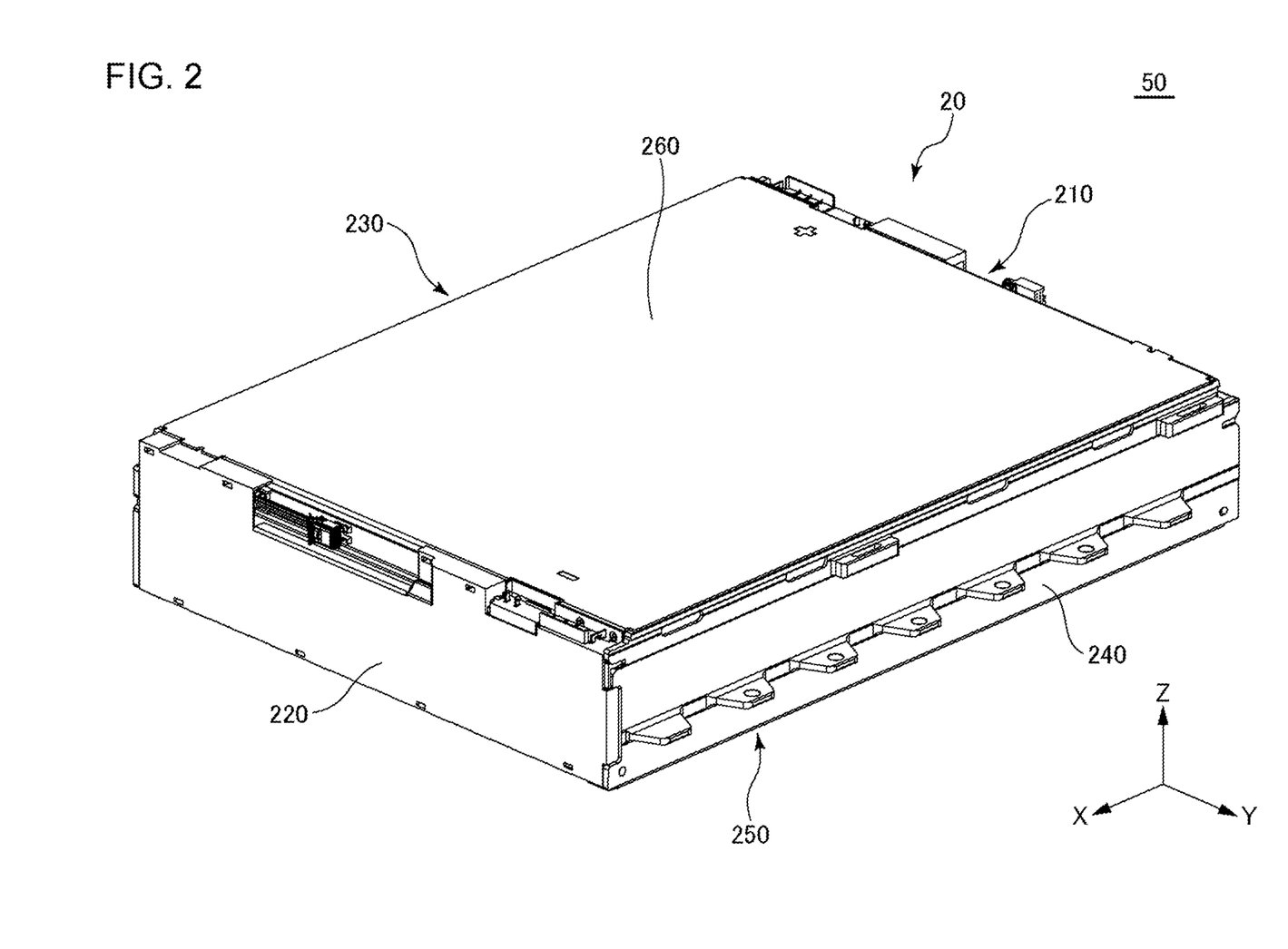
FIG. 2 is a perspective view of the battery module according to the embodiment when viewed from the rear.
Figure 3:
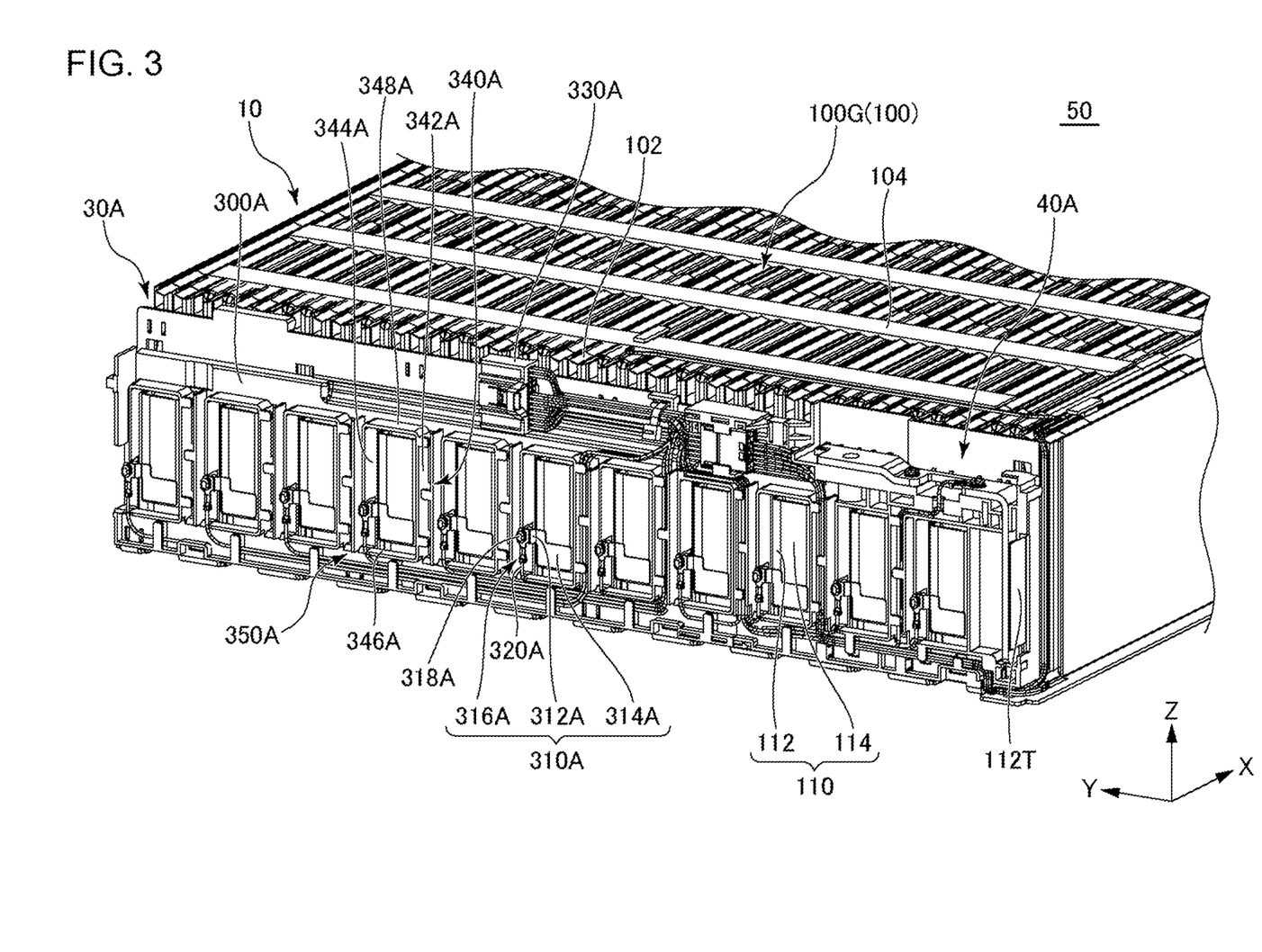
FIG. 3 is a view with a housing body detached from FIG. 1.
Figure 4:
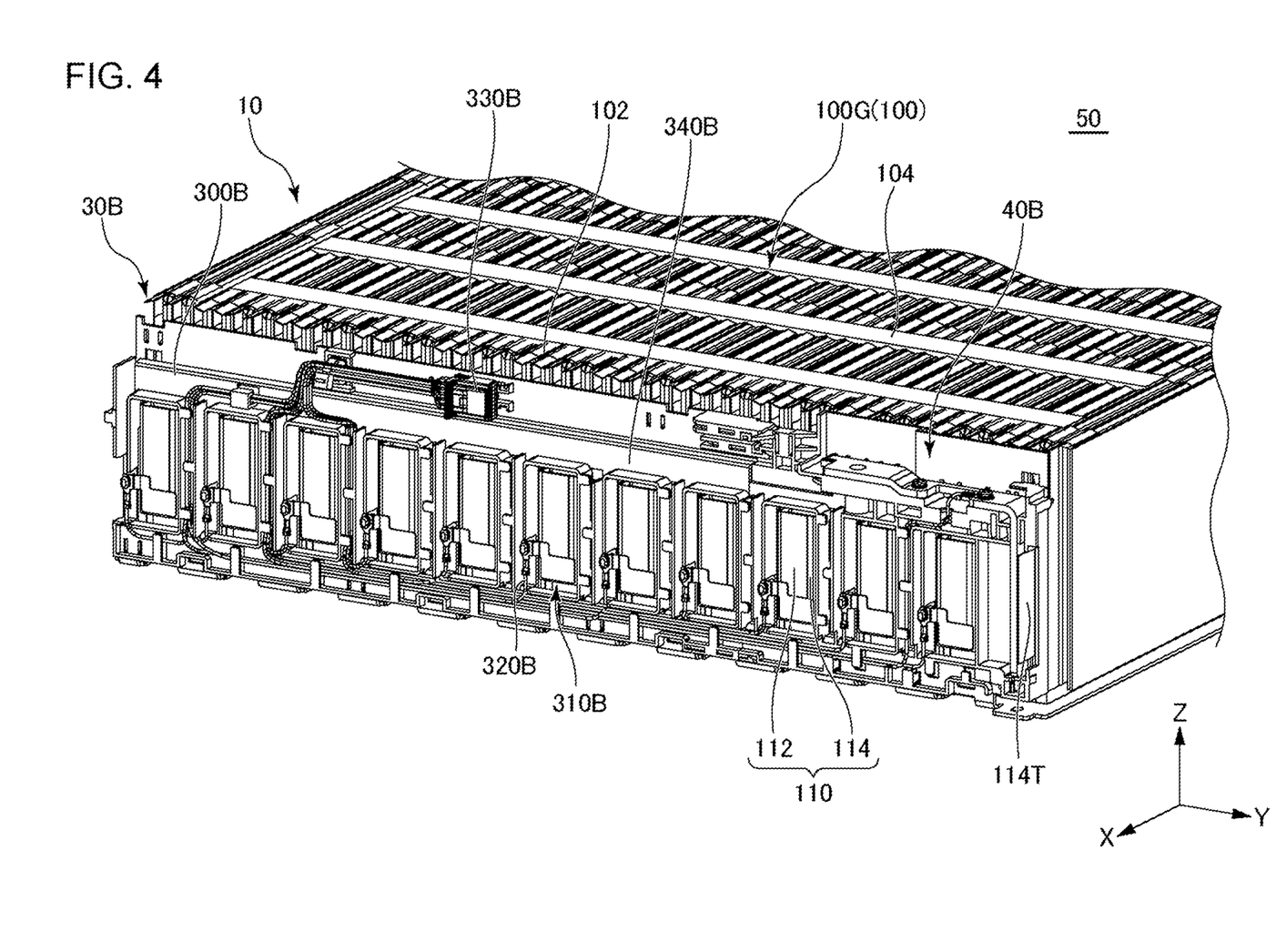
FIG. 4 is a view with the housing body detached from FIG. 2.
Figure 5:
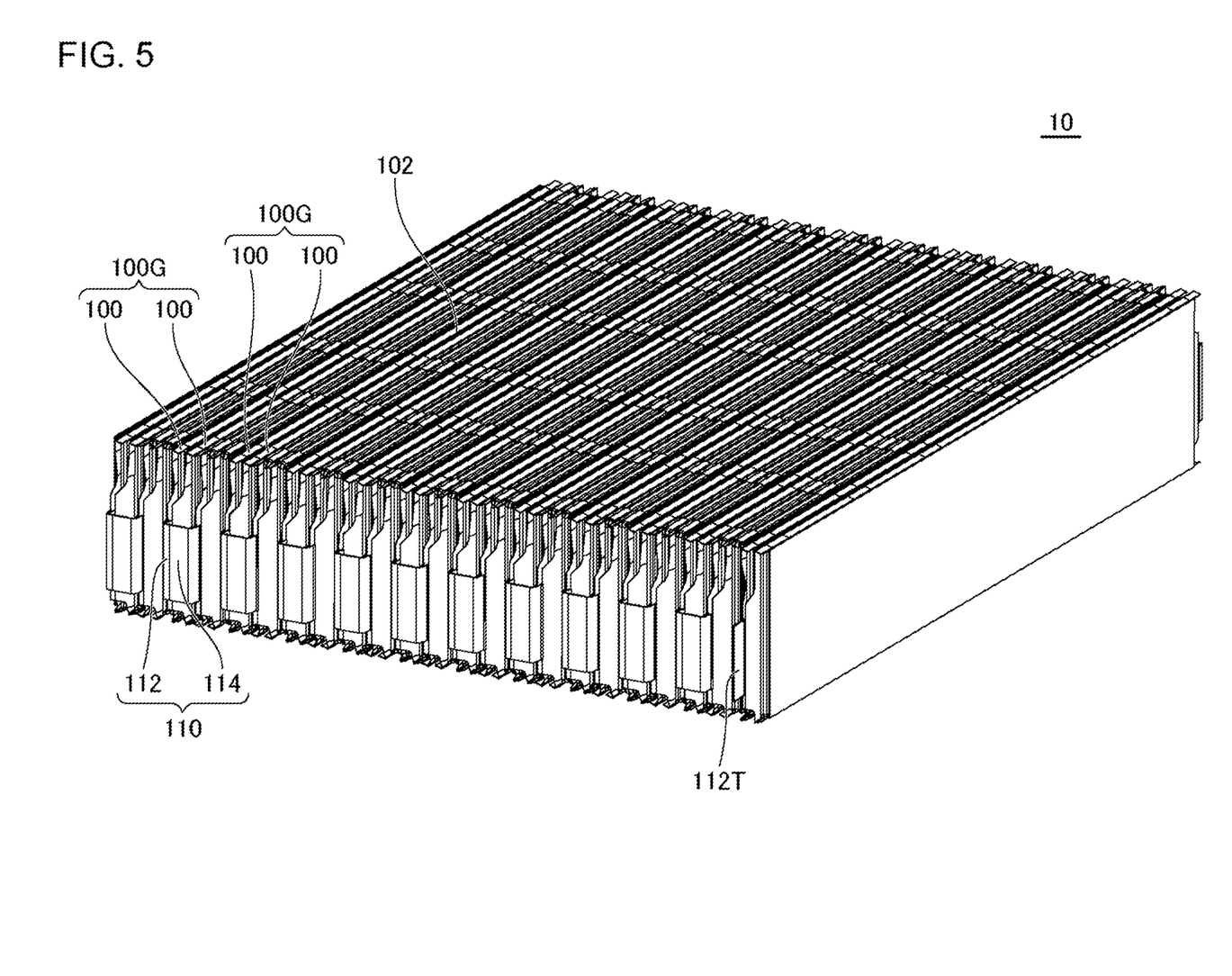
FIG. 5 is a perspective view of a cell stacked body according to the embodiment when viewed from the front.

FIG. 1 is a perspective view of a battery module 50 according to an embodiment when viewed from the front. FIG. 2 is a perspective view of the battery module 50 according to the embodiment when viewed from the rear. FIG. 3 is a view with a housing body 20 detached from FIG. 1. FIG. 4 is a view with the housing body 20 detached from FIG. 2. FIG. 5 is a perspective view of a cell stacked body 10 according to the embodiment when viewed from the front.

In FIGS. 1 to 5, arrows indicating a first direction X, a second direction Y, and a third direction Z indicate that a direction from the base end toward the tip end of the arrow is a positive direction of a direction indicated by the arrow, and a direction from the tip end to the base end of the arrow is a negative direction of the direction indicated by the arrow. The first direction X indicates one direction parallel to the horizontal direction perpendicular to the vertical direction. Specifically, the first direction X indicates the front-back direction of the battery module 50. The positive direction of the first direction X is a direction from the front to the rear of the battery module 50. The negative direction of the first direction X is a direction from the rear to the front of the battery module 50. The second direction Y indicates a direction perpendicular to the vertical direction and the first direction X. The second direction Y indicates the left-right direction of the battery module 50. The positive direction of the second direction Y is a direction from the right to the left of the battery module 50 when viewed from the front of the battery module 50. The negative direction of the second direction Y is a direction from the left to the right of the battery module 50 when viewed from the front of the battery module 50. The third direction Z indicates a direction parallel to the vertical direction. The positive direction of the third direction Z is a direction from the lower side to the upper side of the battery module 50. The negative direction of the third direction Z is a direction from the upper side to the lower side of the battery module 50.

The relationship of the first direction X, the second direction Y, the third direction Z, the vertical direction, and the horizontal direction is not limited to the above-described example. For example, the battery module 50 may be disposed so that the first direction X or the second direction Y is parallel to the vertical direction.

Hereinafter, unless otherwise specified, "right" and "left" mean the right and the left when viewed from the front of the battery module 50, respectively.

In the present embodiment, the battery module 50 is mounted on a moving object such as an automobile. However, the use of the battery module 50 is not limited to this example.

The battery module 50 includes a cell stacked body 10, a housing body 20, a first voltage detection device 30A, and a second voltage detection device 30B. The first voltage detection device 30A includes a first fuse device 40A. The second voltage detection device 30B includes a second fuse device 40B. As will be described later with reference to FIG. 6, the first fuse device 40A includes a fuse electrically connected to a terminal positive electrode lead 112T. The second fuse device 40B includes a fuse electrically connected to a terminal negative electrode lead 114T.

As shown in FIG. 5, the cell stacked body 10 includes a plurality of cell groups 100G stacked in the second direction Y. Each cell group 100G includes a plurality of battery cells 100 stacked in the second direction Y. Each battery cell 100 includes an exterior material 102, a positive electrode lead 112, and a negative electrode lead 114.

In the present embodiment, each cell group 100G includes two battery cells 100. However, each cell group 100G may include three or more battery cells 100. In the cell stacked body 10, the plurality of cell groups 100G may not be connected in series, but the plurality of battery cells 100 may be connected in series. In other words, the number of battery cells 100 in the cell group 100G may be only one.

Each battery cell 100 is placed substantially vertically. The battery cell 100 being placed substantially vertically does not only refer to the battery cell 100 being placed exactly vertically. The battery cell 100 being placed substantially vertically may also refer to the battery cell 100 being inclined diagonally from the third direction Z to the extent that the operation of the battery module 50 is not hindered.

As shown in FIGS. 3 and 4, a plurality of adhesive members 104 are disposed on the upper surface of the cell stacked body 10. Each adhesive member 104 is, for example, a cured body of liquid resin. In the present embodiment, the plurality of adhesive members 104 are regularly arranged. Specifically, the plurality of adhesive members 104 extend parallel to the second direction Y and are arranged in parallel to the first direction X. An insulating sheet (not shown) is disposed above the plurality of adhesive members 104. A sixth cover member 260, which will be described later, is disposed above the insulating sheet (not shown). The layout of the adhesive members 104 is not limited to the layout according to the present embodiment. For example, the adhesive member 104 may be provided over the entire upper surface of the cell stacked body 10. Alternatively, the plurality of adhesive members 104 may be irregularly arranged, or may be arranged in accordance with a rule different from the rules shown in FIGS. 3 and 4. Adhesive members are also arranged on the lower surface of the cell stacked body 10 in a manner similar to the upper surface of the cell stacked body 10.

The exterior material 102 houses a positive electrode, a negative electrode, and a separator (not shown) together with an electrolytic solution (not shown). In one example, the positive electrode, the negative electrode, and the separator are stacked in the exterior material 102 in the second direction Y. Alternatively, the positive electrode, the negative electrode, and the separator may be wound in the exterior material 102.

The positive electrode lead 112 is drawn from one of the front end and the rear end of the exterior material 102 substantially in the horizontal direction. The positive electrode lead 112 is electrically connected to the positive electrode in the exterior material 102. In one example, the positive electrode lead 112 is made of metal such as aluminum. The positive electrode lead 112 being drawn substantially in the horizontal direction does not only refer to the positive electrode lead 112 being drawn strictly in the horizontal direction. The positive electrode lead 112 being drawn substantially in the horizontal direction may also refer to the positive electrode lead 112 being drawn in a direction shifted from the horizontal direction to the extent that the operation of the battery module 50 is not hindered.

The negative electrode lead 114 is drawn from the other of the front end and the rear end of the exterior material 102 substantially in the horizontal direction. The negative electrode lead 114 is electrically connected to the negative electrode in the exterior material 102. In one example, the negative electrode lead 114 is made of metal, such as copper, which is different from the metal forming the positive electrode lead 112. The negative electrode lead 114 being drawn substantially in the horizontal direction does not only refer to the negative electrode lead 114 being drawn strictly in the horizontal direction. The negative electrode lead 114 being drawn substantially in the horizontal direction may also refer to the negative electrode lead 114 being drawn in a direction shifted from the horizontal direction to the extent that the operation of the battery module 50 is not hindered.

When each cell group 100G includes a plurality of battery cells 100, the plurality of battery cells 100 are connected in parallel. Specifically, the plurality of battery cells 100 in each cell group 100G are stacked in the second direction Y. The positive electrode leads 112 of the plurality of battery cells 100 in each cell group 100G are bundled in the second direction Y and connected to each other. The negative electrode leads 114 of the plurality of battery cells 100 in each cell group 100G are bundled in the second direction Y and connected to each other. Adjacent battery cells 100 may be stacked through an adhesive member. Examples of the adhesive member include a double-sided tape and a member that cures liquid resin.

The plurality of cell groups 100G are connected in series via the lead portion 110. The lead portion 110 includes a plurality of positive electrode leads 112 of one cell group 100G of the cell groups 100G adjacent to each other in the second direction Y and a plurality of negative electrode leads 114 of the other cell group 100G of the cell groups 100G adjacent to each other in the second direction Y. The plurality of positive electrode leads 112 and the negative electrode leads 114 in the lead portion 110 are bonded to each other by bonding methods such as laser welding, ultrasonic bonding, resistance welding, and adhesion. When the material of the positive electrode lead 112 is different from the material of the negative electrode lead 114, laser welding is preferable among the above bonding methods from the viewpoint of high bonding reliability and reduction in the number of components. The lead portion 110 is folded back between the cell groups 100G adjacent to each other in the second direction Y. Thus, a plurality of lead portions 110 are arranged in the second direction Y in front of the cell stacked body 10. A plurality of lead portions 110 are arranged in the second direction Y in the rear of the cell stacked body 10.

In the present embodiment, as shown in FIG. 3, a plurality of negative electrode leads 114 are located in front of the plurality of positive electrode leads 112 at bonding portions of the plurality of positive electrode leads 112 and the plurality of negative electrode leads 114 in each lead portion 110 located in front of the cell stacked body 10. As shown in FIG. 4, the plurality of positive electrode leads 112 are located in rear of the plurality of negative electrode leads 114 at bonding portions of the plurality of positive electrode leads 112 and the plurality of negative electrode leads 114 in each lead portion 110 located in rear of the cell stacked body 10. When the plurality of positive electrode leads 112 are located in front of the plurality of negative electrode leads 114 in front of the cell stacked body 10, the material of a first tip end portion 314A described later is preferably the same as the material of the positive electrode lead 112.

In the present embodiment, as shown in FIG. 3, the plurality of positive electrode leads 112 in the cell group 100G at one end of the plurality of cell groups 100G connected in series are located on the right front side of the cell stacked body 10. If necessary, the plurality of positive electrode leads 112 in the cell group 100G at one end of the plurality of cell groups 100G connected in series are referred to as terminal positive electrode leads 112T below. As shown in FIG. 4, the plurality of negative electrode leads 114 in the cell group 100G at the other end of the plurality of cell groups 100G connected in series are located on the left rear side of the cell stacked body 10. If necessary, the plurality of negative electrode leads 114 in the cell group 100G at the other end of the plurality of cell groups 100G connected in series are referred to as terminal negative electrode leads 114T below.

The structure of the cell stacked body 10 is not limited to the structure according to the present embodiment. For example, the terminal negative electrode lead 114T may be located on the left front side of the cell stacked body 10 instead of the left rear side. In this example, both the terminal positive electrode lead 112T and the terminal negative electrode lead 114T are located on the front side. Whether the terminal negative electrode lead 114T is located on the left front side or the left rear side of the cell stacked body 10 can be adjusted by the number of cell groups 100G stacked in the second direction Y.

In the present embodiment, as shown in FIG. 3, the front surface of the bonding portion of the positive electrode lead 112 and the negative electrode lead 114 in each lead portion 110 located in front of the cell stacked body 10 is substantially parallel to the direction perpendicular to the first direction X. The front surface of the bonding portion being substantially parallel to the direction perpendicular to the first direction X does not only refer to the front surface of the bonding portion being exactly parallel to the direction perpendicular to the first direction X. The front surface of the bonding portion being substantially parallel to the direction perpendicular to the first direction X may also refer to the front surface of the bonding portion being slightly deforming from a state of being parallel to the direction perpendicular to the first direction X to the extent that the function of the lead portion 110 is not hindered. In the present embodiment, a first voltage detection portion 310A, which will be described later, can be easily bonded to the front surface of the lead portion 110 as compared with a case where the front surface of the bonding portion is curved. In another example different from the present embodiment, the front surface of the bonding portion described above may be curved.

In the present embodiment, as shown in FIG. 4, the rear surface of the bonding portion of the positive electrode lead 112 and the negative electrode lead 114 in each lead portion 110 located in rear of the cell stacked body 10 is substantially parallel to the direction perpendicular to the first direction X in a manner similar to the front surface of the bonding portion of the positive electrode lead 112 and the negative electrode lead 114 in each lead portion 110 located in front of the cell stacked body 10.

The housing body 20 houses the cell stacked body 10, the first voltage detection device 30A, and the second voltage detection device 30B. The housing body 20 includes a first cover member 210, a second cover member 220, a third cover member 230, a fourth cover member 240, a fifth cover member 250, and a sixth cover member 260. In the present embodiment, the first cover member 210, the second cover member 220, the third cover member 230, the fourth cover member 240, the fifth cover member 250, and the sixth cover member 260 is made of metal containing aluminum as a main component. However, the materials forming the first cover member 210, the second cover member 220, the third cover member 230, the fourth cover member 240, the fifth cover member 250, and the sixth cover member 260 are not limited to this example.

The first cover member 210 covers the front side of the cell stacked body 10 and the first voltage detection device 30A. The second cover member 220 covers the rear side of the cell stacked body 10 and the second voltage detection device 30B. The third cover member 230 covers the right side of the cell stacked body 10. The fourth cover member 240 covers the left side of the cell stacked body 10. The fifth cover member 250 covers the lower side of the cell stacked body 10. The sixth cover member 260 covers the upper side of the cell stacked body 10.

As shown in FIGS. 1 and 2, a "+" mark is attached to the right front side of the upper surface of the sixth cover member 260. A "−" mark is attached to the left rear side of the upper surface of the sixth cover member 260. The "+" mark indicates that the terminal positive electrode lead 112T shown in FIG. 3 is located at the position to which the "+" mark is attached. The "−" mark indicates that the terminal negative electrode lead 114T shown in FIG. 4 is located at the position to which the "−" mark is attached. Thus, a user of the battery module 50 can determine, from the "+" mark and the "−" mark, the position of the terminal positive electrode lead 112T and the position of the terminal negative electrode lead 114T even when the cell stacked body 10 is hardly visible from the outside of the housing body 20.

The first voltage detection device 30A includes a first holding body 300A, a plurality of first voltage detection portions 310A, a plurality of first voltage detection lines 320A, and a first connector 330A.

The first holding body 300A is provided in front of the cell stacked body 10. The first holding body 300A is an insulator. Examples of the insulator include polypropylene-based resin or resin having a hardness and an insulating property equal to or higher than a hardness and an insulating property of the polypropylene-based resin. The first holding body 300A is attached to the housing body 20 by mechanical bonding such as a snap fit and a screw.

Each first voltage detection portion 310A includes a first base end portion 312A, a first tip end portion 314A, and a first connection portion 316A.

The first base end portion 312A is movably supported in the first direction X along a first support shaft 318A provided at the first holding body 300A. Thus, each first voltage detection portion 310A is held by the first holding body 300A. The first support shaft 318A penetrates in the first direction X a through-hole provided in the first base end portion 312A. The diameter of the front end portion of the first support shaft 318A in the direction perpendicular to the first direction X is larger than the diameter of the through-hole of the first base end portion 312A in the direction perpendicular to the first direction X. Thus, the first base end portion 312A is suppressed from escaping from the first support shaft 318A toward the front of the first support shaft 318A.

In the present embodiment, when viewed from the front of the cell stacked body 10, the first tip end portion 314A is offset from the first base end portion 312A in the horizontal direction and the vertical direction. Specifically, when viewed from the front of the cell stacked body 10, the first tip end portion 314A is located on the lower right side of the first base end portion 312A. As a result, a gap from which a portion of the front surface of the lead portion 110 is exposed toward the front is provided on the right side of the first base end portion 312A and on the upper side of the first tip end portion 314A. Accordingly, at least a portion of the bonding portion such as a laser welding portion between the positive electrode lead 112 and the negative electrode lead 114 can be provided in a region of the lead portion 110 overlapping the gap in the first direction X. That is, it is necessary that the bonding portion of the lead portion 110 does not overlap the first tip end portion 314A in the first direction X. Accordingly, in the present embodiment, the length of the bonding portion of the lead portion 110 in the vertical direction can be increased as compared with, for example, a case where the first tip end portion 314A is located on the right side of the first base end portion 312A without offset downward from the first base end portion 312A. Thus, in the present embodiment, the connection between the positive electrode lead 112 and the negative electrode lead 114 in the lead portion 110 can be improved as compared with the above-described case.

In the present embodiment, the first tip end portion 314A is offset from the first base end portion 312A to the side on which the lead portion 110 is located. Accordingly, in the present embodiment, as compared with a case where the position of the first base end portion 312A in the first direction X and the position of the first tip end portion 314A in the first direction X are aligned in the first direction X, the first tip end portion 314A can be easily close to the lead portion 110, and the first tip end portion 314A can be easily connected to the lead portion 110. In the present embodiment, a movable range of the first base end portion 312A in the first direction X can be increased as compared with the above-described case.

Figure 6:
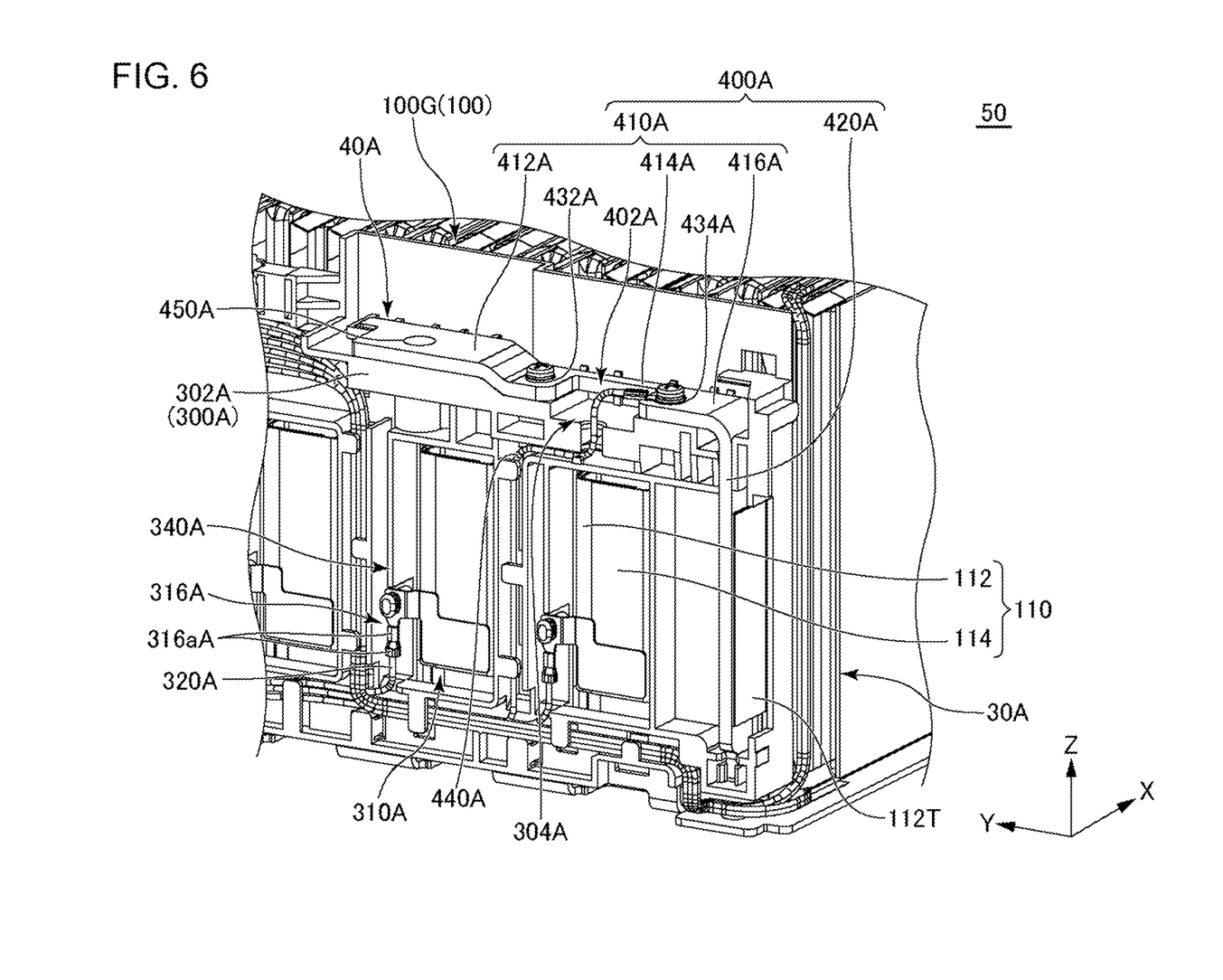
FIG. 6 is an enlarged view of a position of a first voltage detection device according to the embodiment at which a first fuse device is provided.

The first connection portion 316A protrudes downward from the first base end portion 312A. One end of the first voltage detection line 320A is connected to the first connection portion 316A. The first connection portion 316A may be integrated with the first base end portion 312A, for example. As shown in FIG. 6, which will be described later, in the present embodiment, the first connection portion 316A includes two first barrels 316aA that crimp one end of the first voltage detection line 320A. The two first barrels 316aA are arranged in the vertical direction. One end of the first voltage detection line 320A enters into the internal space of the two first barrels 316aA substantially parallel to the vertical direction from the lower sides of the two first barrels 316aA and is crimped by the two first barrels 316aA. As a result, the one end of the first voltage detection line 320A is fixed to the first connection portion 316A. However, a method of fixing the one end of the first voltage detection line 320A to the first connection portion 316A is not limited to the method according to the present embodiment. For example, the number of the first barrels 316aA provided at each first connection portion 316A may be only one. One end of the first voltage detection line 320A may be soldered to the first connection portion 316A.

The shape of the first voltage detection portion 310A is not limited to the shape according to the present embodiment as long as the first tip end portion 314A does not overlap the bonding portion between the positive electrode lead 112 and the negative electrode lead 114 in the lead portion 110 in the first direction X. For example, the gap may not be provided on the right side of the first base end portion 312A and on the upper side of the first tip end portion 314A when viewed from the front of the cell stacked body 10. The position of the first base end portion 312A in the first direction X and the position of the first tip end portion 314A in the first direction X may be aligned in the first direction X.

Each of the plurality of first voltage detection portions 310A is connected to each of the plurality of lead portions 110 in front of the cell stacked body 10. Specifically, each first tip end portion 314A is bonded to each lead portion 110 in front of the cell stacked body 10 by a bonding method such as laser welding. In the present embodiment, the rear surface of the first tip end portion 314A is bonded to the front surface of the bonding portion of the positive electrode lead 112 and the negative electrode lead 114 in the lead portion 110. The first tip end portion 314A is preferably made of the same material as the portion of the lead portion 110 in contact with the first tip end portion 314A. In the present embodiment, the first tip end portion 314A is in contact with the negative electrode lead 114. In this example, the first tip end portion 314A can be easily bonded to the negative electrode lead 114 as compared with a case where the first tip end portion 314A is made of a material different from the material of the negative electrode lead 114. In another example, the first tip end portion 314A may be made of a material different from the portion of the lead portion 110 in contact with the first tip end portion 314A.

Each of the plurality of first voltage detection lines 320A electrically connects each of the plurality of first voltage detection portions 310A to the first connector 330A. As described above, one end of each first voltage detection line 320A is connected to the first connection portion 316A. The other end of each first voltage detection line 320A is connected to the first connector 330A. In the present embodiment, a portion of each first voltage detection line 320A is drawn from the first connection portion 316A to a space below a first frame 340A through a notch 350A provided in the first frame 340A described later. The notch 350A is provided at a corner of the first frame 340A between a second edge portion 344A and a third edge portion 346A, which will be described later. The other portion of each first voltage detection line 320A passes through a space between adjacent first frames 340A in a region offset from the center of the first holding body 300A to the right side, and then is drawn from a space below a plurality of first frames 340A to the first connector 330A located above the plurality of first frames 340A. The position of the first voltage detection portion 310A, the routing of the first voltage detection lines 320A, the position of the notch 350A, and the position of the first connector 330A are not limited to the examples according to the present embodiment.

In the present embodiment, at least a portion of a region of the first voltage detection line 320A located between the first connection portion 316A and the notch 350A has flexibility. When the first base end portion 312A is moved along the first support shaft 318A in the first direction X, the first voltage detection line 320A may come into contact with the first holding body 300A or the first frame 340A in the vicinity of the notch 350A. Even in such a case, at least the above portion of the first voltage detection line 320A is bent such that the first base end portion 312A can be moved along the first support shaft 318A in the first direction X.

The first holding body 300A has a plurality of first frames 340A. The first frame 340A is an insulator. Examples of the insulator include polypropylene-based resin or resin having a hardness and an insulating property equal to or higher than a hardness and an insulating property of the polypropylene-based resin. Each of the plurality of first frames 340A surrounds each of the plurality of lead portions 110 and each of the plurality of first voltage detection portions 310A. Thus, the first frame 340A can protect the lead portion 110 and the first voltage detection portion 310A from an external impact. Each first frame 340A may not be located in the entire region surrounding each lead portion 110 and each first voltage detection portion 310A. Each first frame 340A may be located in at least a portion of a region surrounding each lead portion 110 and each first voltage detection portion 310A. The first holding body 300A may be formed with a single member, or may be formed with a plurality of members combined with each other.

Each first frame 340A has a first edge portion 342A, a second edge portion 344A, a third edge portion 346A and a fourth edge portion 348A. The first edge portion 342A extends in the vertical direction on the right side of the lead portion 110 and the first voltage detection portion 310A surrounded by the first frame 340A. The second edge portion 344A extends in the vertical direction on the left side of the lead portion 110 and the first voltage detection portion 310A surrounded by the first frame 340A. The third edge portion 346A extends in the left-right direction on the lower side of the lead portion 110 and the first voltage detection portion 310A surrounded by the first frame 340A. The fourth edge portion 348A extends in the left-right direction on the upper side of the lead portion 110 and the first voltage detection portion 310A surrounded by the first frame 340A.

The shape of the first frame 340A is not limited to the shape according to the present embodiment. For example, the first frame 340A may not have one of the first edge portion 342A and the second edge portion 344A. The first frame 340A may not have at least one of the third edge portion 346A and the fourth edge portion 348A.

In the present embodiment, at least a portion of an insulator forming each first frame 340A is located between the first voltage detection portion 310A surrounded by each first frame 340A and a lead portion 110 different from the lead portion 110 connected to the first voltage detection portion 310A. Thus, in the present embodiment, the electrical insulation can be secured between the first voltage detection portion 310A surrounded by each first frame 340A and the lead portion 110 different from the lead portion 110 connected to the first voltage detection portion 310A.

Specifically, at least a portion of an insulator forming the first edge portion 342A except the first frame 340A located at the rightmost end is located between the first voltage detection portion 310A located on the left side of the first edge portion 342A and the lead portion 110 located on the right side of the first edge portion 342A. Thus, as compared with a case where the first edge portion 342A is not provided, the electrical insulation can be secured between the first voltage detection portion 310A located on the left side of the first edge portion 342A and the lead portion 110 located on the right side of the first edge portion 342A.

At least a portion of an insulator forming the second edge portion 344A except the first frame 340A located at the leftmost end is located between the first voltage detection portion 310A located on the right side of the second edge portion 344A and the lead portion 110 located on the left side of the second edge portion 344A. Thus, as compared with a case where the second edge portion 344A is not provided, the electrical insulation can be secured between the first voltage detection portion 310A located on the right side of the second edge portion 344A and the lead portion 110 located on the left side of the second edge portion 344A.

In the present embodiment, at least a portion of an insulator forming each first frame 340A is located between different lead portions 110. Specifically, at least a portion of an insulator forming each first frame 340A is located between the lead portions 110 adjacent to each other. Thus, the electrical insulation can be secured between the different lead portions 110 as compared with a case where at least the portion of an insulator forming each first frame 340A is not located between the different lead portions 110.

Specifically, at least a portion of an insulator forming the first edge portion 342A except the first frame 340A located at the rightmost end is located between the lead portion 110 located on the left side of the first edge portion 342A and the lead portion 110 located on the right side of the first edge portion 342A. Thus, as compared with a case where the first edge portion 342A is not provided, the electrical insulation can be secured between the lead portion 110 located on the left side of the first edge portion 342A and the lead portion 110 located on the right side of the first edge portion 342A.

At least a portion of the insulator forming the second edge portion 344A except the first frame 340A located at the leftmost end is located between the lead portion 110 located on the right side of the second edge portion 344A and the lead portion 110 located on the left side of the second edge portion 344A. Thus, as compared with a case where the second edge portion 344A is not provided, the electrical insulation can be secured between the lead portion 110 located on the right side of the second edge portion 344A and the lead portion 110 located on the left side of the second edge portion 344A.

An insulating protrusion portion that protrudes toward the positive direction side of the first direction X may be provided on the surface of the first frame 340A on the positive direction side of the first direction X. At least a portion of the protrusion portion is located between the lead portions 110 adjacent to each other in the second direction Y. For example, the protrusion portion is provided on the positive direction side of the first direction X of the first edge portion 342A of the left first frame 340A of the first frames 340A adjacent to each other in the second direction Y, and is provided on the positive direction side of the first direction X of the second edge portion 344A of the right first frame 340A of the first frames 340A adjacent to each other in the second direction Y. In this example, when the lead portions 110 adjacent to each other in the second direction Y are displaced in the second direction Y due to a factor such as an impact from the outside, the lead portions 110 hit the protrusion portion. This can suppress collision between the lead portions 110 adjacent to each other in the second direction Y. The length of the protrusion portion is not particularly limited, but may be, for example, a length for suppressing the collision between the lead portions 110 adjacent to each other in the second direction Y. The position at which the protrusion portion is provided is not limited to the above-described example.

In the present embodiment, at least a portion of the insulator forming each first frame 340A is located between at least one lead portion 110 and at least a conductive portion of the housing body 20. Accordingly, in the present embodiment, the electrical insulation can be secured between at least one lead portion 110 and at least a conductive portion of the housing body 20.

Specifically, at least a portion of the third edge portion 346A is located below the lead portion 110 surrounded by each first frame 340A. In the present embodiment, the front end portion of the fifth cover member 250 is located below the lower end portion of the lead portion 110. When the fifth cover member 250 has conductivity and the lower end portion of the lead portion 110 is in contact with the front end portion of the fifth cover member 250, the lead portion 110 and the fifth cover member 250 may be short-circuited. On the other hand, in the present embodiment, at least a portion of an insulator forming the third edge portion 346A is located between the lower end portion of the lead portion 110 and the front end portion of the fifth cover member 250. This can suppress an occurrence of a short circuit between the lead portion 110 and the fifth cover member 250 as compared with a case where the third edge portion 346A is not provided.

In the above-described example, it has been described that the third edge portion 346A secures the electrical insulation between the lower end portion of the lead portion 110 and the front end portion of the fifth cover member 250. However, securing the electrical insulation between the lead portion 110 and the housing body 20 by the first frame 340A is not limited to the above-described example. For example, the fourth edge portion 348A can secure the electrical insulation between the upper end portion of the lead portion 110 and the front end portion of the sixth cover member 260. The first edge portion 342A of the first frame 340A located at the rightmost end of the plurality of first frame 340A can secure the electrical insulation between the right end portion of the lead portion 110 located at the rightmost end of the plurality of lead portions 110 and the front end portion of the third cover member 230. The second edge portion 344A of the first frame 340A located at the leftmost end of the plurality of first frame 340A can secure the electrical insulation between the left end portion of the lead portion 110 located at the leftmost end of the plurality of lead portions 110 and the front end portion of the fourth cover member 240.

In the present embodiment, the second edge portion 344A of the first frame 340A surrounding the right lead portion 110 of the lead portions 110 adjacent to each other in the second direction Y and the first edge portion 342A of the first frame 340A surrounding the left lead portion 110 of the lead portions 110 adjacent to each other in the second direction Y are located between the lead portions 110 adjacent to each other in the second direction Y. Thus, a distance in the second direction Y between the lead portions 110 adjacent to each other in the second direction Y is required to be larger than a distance in the second direction Y between the above-described second edge portion 344A and the above-described first edge portion 342A located between the lead portions 110 adjacent to each other in the second direction Y. The distance in the second direction Y between the lead portions 110 adjacent to each other in the second direction Y increases as the number of battery cells 100 in the cell group 100G increases. Accordingly, as compared with a case where the number of battery cells 100 in the cell group 100G is only one, the distance in the second direction Y between the lead portions 110 adjacent to each other in the second direction Y is more easily increased when the number of battery cells 100 in the cell group 100G is plural.

Similar to the first voltage detection device 30A, the second voltage detection device 30B includes a second holding body 300B, a plurality of second voltage detection portions 310B, a plurality of second voltage detection lines 320B, and a second connector 330B.

The second holding body 300B is provided in rear of the cell stacked body 10. Each of the plurality of second voltage detection portions 310B is connected to each of the plurality of lead portions 110 in rear of the cell stacked body 10. In the present embodiment, the surface of each second voltage detection portion 310B on the negative direction side of the first direction X is bonded to the surface of the bonding portion of the positive electrode lead 112 and the negative electrode lead 114 in the lead portion 110 on the positive direction side of the first direction X. Each of the plurality of second voltage detection lines 320B electrically connects each of the plurality of second voltage detection portions 310B to the second connector 330B. A plurality of second frames 340B are provided at the second holding body 300B. Similar to the plurality of first frames 340A, each of the plurality of second frames 340B surrounds each of the plurality of lead portions 110 provided in rear of the cell stacked body 10 and each of the plurality of second voltage detection portions 310B.

FIG. 6 is an enlarged view of a position of the first voltage detection device 30A according to the embodiment at which the first fuse device 40A is provided.

The first fuse device 40A includes a first base 302A, a first conductor 400A, a first fixture 432A, a second fixture 434A, and a first wiring 440A.

The first base 302A includes the right end portion of the first holding body 300A. In the present embodiment, the first base 302A includes two first frames 340A at the rightmost end of the plurality of first frames 340A.

The first conductor 400A is provided at the first base 302A. The first conductor 400A is made of, for example, metal. The first conductor 400A functions as a bus bar electrically connected to the terminal positive electrode lead 112T.

The first conductor 400A includes a plurality of extension bodies extending in different directions. At least a portion of at least one of the plurality of extension bodies is held by the first base 302A.

Specifically, the first conductor 400A includes a first extension body 410A extending in the horizontal direction and a second extension body 420A extending in the vertical direction. The second extension body 420A extends downward from the right end portion of the first extension body 410A. The first extension body 410A and the second extension body 420A are integrally formed. The first conductor 400A may be formed by bonding, for example, metal for the first extension body 410A and metal for the second extension body 420A. However, a method of forming the first conductor 400A is not limited to this example. The shape of the first conductor 400A is not limited to the shape according to the present embodiment. For example, the first conductor 400A may not include the second extension body 420A.

The first extension body 410A includes a first wide portion 412A, a narrow portion 414A, and a second wide portion 416A. The left end of the narrow portion 414A is connected to the right end of the first wide portion 412A. The right end of the narrow portion 414A is connected to the left end of the second wide portion 416A.

The first wide portion 412A functions as a terminal to electrically connect to another battery module (not shown). A fastening hole 450A is provided at the left end portion of the first wide portion 412A. For example, a fixture (not shown) for fixing a bus bar (not shown) that is electrically connected to another battery module is fixed to the fastening hole 450A. In the present embodiment, the peripheral portion of the fastening hole 450A of the first wide portion 412A is located higher than the narrow portion 414A. However, the peripheral portion of the fastening hole 450A of the first wide portion 412A may be located at the same height as the narrow portion 414A.

The narrow portion 414A functions as a fuse. The width of the narrow portion 414A in the first direction X is narrower than both of the width of the first wide portion 412A in the first direction X and the width of the second wide portion 416A in the first direction X. Accordingly, the cross-sectional area of the narrow portion 414A perpendicular to the second direction Y is smaller than any of the cross-sectional area of the first wide portion 412A perpendicular to the second direction Y and the cross-sectional area of the second wide portion 416A perpendicular to the second direction Y. Thus, when an overcurrent flows through the first conductor 400A, the narrow portion 414A is more easily to melt than the first wide portion 412A and the second wide portion 416A are.

In the present embodiment, the narrow portion 414A is attached to the first holding body 300A. Thus, the first voltage detection portion 310A and the fuse can be provided in a spatially efficient manner as compared with a case where the structure for holding the fuse is provided separately from the first holding body 300A.

Additionally, in the present embodiment, the size of the battery module 50 can be reduced as compared with a case where a tubular fuse tube is used as the fuse. Specifically, when a tubular fuse is used, the larger the energy of the battery module 50, the larger the size of the tubular fuse. Accordingly, in the battery module 50 having relatively high energy, a space for providing the tubular fuse becomes relatively large. On the other hand, when a portion of the first conductor 400A functions as the fuse, the space for providing the fuse can be reduced as compared with a case where the tubular fuse is used.

In the present embodiment, the narrow portion 414A extends in the same direction as an extension direction of the first wide portion 412A. That is, the first wide portion 412A and the narrow portion 414A extend in the second direction Y. When the narrow portion 414A is provided at the second extension body 420A and extends in a direction perpendicular to the extension direction of the first wide portion 412A, it may be difficult to bond the narrow portion 414A provided at the second extension body 420A to the terminal positive electrode lead 112T. On the other hand, in the present embodiment, it is not necessary to provide the narrow portion 414A at the second extension body 420A. Thus, in the present embodiment, the length of the bonding portion in the third direction Z between the second extension body 420A and the terminal positive electrode lead 112T can be increased as compared with the above-described case. In the present embodiment, the length of the narrow portion 414A in the second direction Y can be easily adjusted as compared with the above-described case. Furthermore, in the present embodiment, the narrow portion 414A and the terminal positive electrode lead 112T can be spaced farther apart than in the above-described case. Thus, in the present embodiment, an influence on the terminal positive electrode lead 112T by heat generated from the narrow portion 414A can be suppressed as compared with the above-described case.

A first space 402A defining the narrow portion 414A is provided in front of the narrow portion 414A of the first extension body 410A. In the present embodiment, the first space 402A is formed by punching with press processing the front portion of a portion functioning as the narrow portion 414A of a conductor forming the first extension body 410A.

A space defining the narrow portion 414A is not provided in rear of the narrow portion 414A of the first extension body 410A. However, a method of forming the narrow portion 414A is not limited to the method according to the present embodiment. For example, the first space 402A may be provided in rear of the narrow portion 414A. Alternatively, the first space 402A may be provided both in front and rear of the narrow portion 414A. The first space 402A may be formed by a through-hole that penetrates the first extension body 410A in the vertical direction. In this case, portions of the first extension body 410A on both sides of the first space 402A in the first direction X become narrow portions 414A that function as fuses.

When the narrow portion 414A is formed by press processing, the space defining the narrow portion 414A is preferably provided on only one of both sides of the first extension body 410A in the first direction X as in the present embodiment. In this case, it is not necessary to punch out with press processing the rear portion of the portion forming the narrow portion 414A in the conductor forming the first extension body 410A. The present embodiment is compared with a case where both the front portion and the rear portion of the portion forming the narrow portion 414A in the conductor forming the first extension body 410A are punched out with press processing. In the above-described case, it is necessary to simultaneously or separately punch out the front portion and the rear portion of the portion forming the narrow portion 414A. Thus, the mechanical load applied to the narrow portion 414A narrowest in the first extension body 410A during press processing increases as compared with the present embodiment. Accordingly, in the above-described case, as compared with the present embodiment, it is necessary to widen the width of the narrow portion 414A in the first direction X from the viewpoint of suppressing the breakage of the narrow portion 414A. On the other hand, in the present embodiment, as compared to the above-described case, it is possible to reduce the width of the narrow portion 414A in the first direction X and to increase the degree of freedom in dimensions of the narrow portion 414A.

The method of forming the narrow portion 414A is not limited to press processing. The narrow portion 414A may be formed by, for example, laser processing. When the narrow portion 414A is formed by laser processing, the space defining the narrow portion 414A may be provided on only one of both sides of the first extension body 410A in the first direction X, or may be provided on both sides of the first extension body 410A in the first direction X.

A second space 304A is provided below the narrow portion 414A. The second space 304A is defined by a recess provided on the upper surface of the first base 302A on which the first extension body 410A is placed. In the present embodiment, when an overcurrent flows through the first conductor 400A and the narrow portion 414A melts, the melted narrow portion 414A can fall toward the second space 304A. Thus, according to the present embodiment, the accuracy of fusing of the narrow portion 414A can be improved as compared with a case where the lower surface of the narrow portion 414A is in contact with the upper surface of the first base 302A.

In the present embodiment, at least a portion of the narrow portion 414A is located above at least one of the positive electrode lead 112 and the negative electrode lead 114. At least a portion of the first base 302A is located between at least one of the positive electrode lead 112 and the negative electrode lead 114, and at least a portion of the narrow portion 414A, in the third direction Z. Specifically, a portion defining the bottom of the recess in the first base 302A is located between at least one of the positive electrode lead 112 and the negative electrode lead 114, and at least a portion of the narrow portion 414A, in the third direction Z. Thus, the melted narrow portion 414A can be prevented from coming into contact with the positive electrode lead 112 or the negative electrode lead 114 located below the narrow portion 414A.

The portion of the first base 302A located above at least one of the positive electrode lead 112 and the negative electrode lead 114 may have heat resistance. For example, a heat-resistant layer may be provided on the bottom surface of the recess of the first base 302A. The heat-resistant layer may be metal or a ceramic type or vitreous inorganic material and the like. By providing the heat-resistant layer, the melted narrow portion 414A can be more reliably prevented from melting the main body portion of the first base 302A and coming into contact with the positive electrode lead 112, the negative electrode lead 114, or the first wiring 440A.

The first wide portion 412A is fixed to the first base 302A by the first fixture 432A. In the present embodiment, the first fixture 432A is a screw that penetrates the first wide portion 412A in the vertical direction and is inserted into a portion of the first base 302A located below the first wide portion 412A. The first wide portion 412A is provided with a through-hole into which a shaft portion of the first fixture 432A can be inserted in the vertical direction. The first fixture 432A may be a fixture other than a screw, such as a vis, a bolt, or the like.

The second wide portion 416A is fixed to the first base 302A by the second fixture 434A. In the present embodiment, the second fixture 434A is a screw that penetrates the second wide portion 416A in the vertical direction and is inserted into a portion of the first base 302A located below the second wide portion 416A. The second wide portion 416A is provided with a through-hole into which a shaft portion of the second fixture 434A can be inserted in the vertical direction. The second fixture 434A may be a fixture other than a screw, such as a vis, a bolt, or the like.

In the present embodiment, the fixture such as the first fixture 432A and the second fixture 434A is removable from the first conductor 400A. Thus, when, for example, the narrow portion 414A is fused, and thus the first conductor 400A needs to be replaced, the first conductor 400A can be replaced with a new first conductor 400A by detaching the fixture such as the first fixture 432A and the second fixture 434A.

The method of fixing the first conductor 400A to the first base 302A is not limited to the above-described example. For example, at least a portion of the first conductor 400A may be bonded to at least a portion of the first base 302A via mechanical bonding such as snap fit.

In the present embodiment, both the first wide portion 412A and the second wide portion 416A are fixed to the first base 302A by the first fixture 432A and the second fixture 434A. In this case, a force to break the narrow portion 414A can be suppressed from being applied to the narrow portion 414A, as compared with a case where at least one of the first wide portion 412A and the second wide portion 416A is not fixed to the first base 302A. The force to break the narrow portion 414A is generated, for example, when a bus bar (not shown) is attached to the first wide portion 412A in order to electrically connect the battery module 50 to another battery module (not shown), and a fixture (not shown) is fixed to the fastening hole 450A. This is because the fastening hole 450A and the narrow portion 414A are located in substantially the same plane perpendicular to the third direction Z.

The first fixture 432A and the second fixture 434A are preferably arranged at positions close to the narrow portion 414A. For example, the first fixture 432A and the second fixture 434A are preferably provided at positions facing each other through the first space 402A.

In the present embodiment, at least a portion of the first wiring 440A passes through the first space 402A. In this case, the first wiring 440A can be routed in a spatially efficient manner as compared with a case where the first wiring 440A passes through a region different from the first space 402A.

In the present embodiment, at least a portion of the first wiring 440A passes through a portion offset in the horizontal direction from a portion of the first base 302A located below the narrow portion 414A. In the present embodiment, a through-hole that passes through the first wiring 440A is provided on the bottom surface of the recess defining the second space 304A in the first base 302A. The through-hole is located on the negative direction side of the first direction X from a region directly below the narrow portion 414A. Accordingly, the narrow portion 414A melted and fallen into the second space 304A can be less likely to come into contact with the first wiring 440A.

The first wiring 440A has one end connected to the second wide portion 416A and the other end connected to the first connector 330A shown in FIG. 3. A portion of the first wiring 440A is drawn downward from one end of the first wiring 440A connected to the second wide portion 416A, and passes through the first space 402A and the second space 304A. Another portion of the first wiring 440A passes through the portion of the first base 302A located below the second space 304A, and a region between the two rightmost first frames 340A. Then, the other portion of the first wiring 440A is drawn to the space below the plurality of first frames 340A. Still another portion of the first wiring 440A passes through the space between adjacent first frames 340A in the region offset from the center of the first holding body 300A to the right side, and then is drawn from the space below a plurality of first frames 340A to the first connector 330A located above the plurality of first frames 340A. The routing of the first wiring 440A is not limited to the example according to the present embodiment.

In the present embodiment, one end of the first wiring 440A connected to the second wide portion 416A is fixed to the second wide portion 416A by the second fixture 434A. In the present embodiment, the first wiring 440A is easily attached and detached when the narrow portion 414A is fused, as compared with a case where the one end of the first wiring 440A is fixed to the second wide portion 416A by, for example, solder. A connection component such as a crimp terminal may be provided at the one end of the first wiring 440A. In this case, the connection component is fixed by the second fixture 434A, so that the one end of the first wiring 440A can be fixed to the second wide portion 416A. However, the method of connecting the one end of the first wiring 440A to the second wide portion 416A is not limited to this example.

In the present embodiment, the second fixture 434A fixes both the second wide portion 416A and one end of the first wiring 440A connected to the second wide portion 416A, to the first base 302A. In this case, the number of components can be reduced as compared to a case where a fixture to fix the second wide portion 416A to the first base 302A and a fixture to fix the one end of the first wiring 440A to the first base 302A are separately provided. In another example different from the present embodiment, the fixture to fix the second wide portion 416A to the first base 302A and the fixture to fix the one end of the first wiring 440A to the first base 302A may be provided separately.

The portion of the second wide portion 416A at which the second fixture 434A is provided functions as the voltage detection portion that detects the voltage of the terminal positive electrode lead 112T. That is, the terminal positive electrode lead 112T is a voltage detection target of the portion of the second wide portion 416A at which the second fixture 434A is provided. The first wiring 440A functions as the voltage detection line electrically connected to the voltage detection portion. In the present embodiment, one end of the first wiring 440A fixed by the second fixture 434A is electrically connected to the second wide portion 416A. In this case, as compared to a case where the first wiring 440A is electrically connected to the first wide portion 412A, the voltage of the terminal positive electrode lead 112T can be detected with less influence of the voltage drop in the narrow portion 414A, thereby to more accurately detect the voltage of the terminal positive electrode lead 112T.

In FIGS. 3 and 6, the second extension body 420A is electrically connected to the terminal positive electrode lead 112T. In the present embodiment, the right side surface of the second extension body 420A and the left side surface of the terminal positive electrode lead 112T are bonded to each other by a bonding method such as laser welding. The second extension body 420A may not be provided. When the second extension body 420A is not provided, the terminal positive electrode lead 112T and the first extension body 410A can be also electrically connected via an L-shaped bus bar (not shown).

At least a portion of the second extension body 420A is held by at least a portion of the first base 302A. In the present embodiment, the upper end of the first extension body 410A is held by both side surfaces of the through-hole of the first base 302A in the second direction Y through which the upper end of the first extension body 410A penetrates. The lower end of the second extension body 420A is held by both side surfaces of a hole of the first base 302A in the second direction Y into which the lower end of the second extension body 420A is inserted. The present embodiment is preferable because application of a force to rotate the narrow portion 414A in the direction perpendicular to the vertical direction can be suppressed as compared with a case where the second extension body 420A is not held by the first base 302A. Thus, the breakage of the narrow portion 414A can be further suppressed as compared with a case where the second extension body 420A is not held by the first base 302A.

Hitherto, the embodiment of the present invention has been described above with reference to the drawings, but these are examples of the present invention, and various configurations other than the above description can be adopted.

For example, the first fuse device 40A according to the embodiment is electrically connected to the battery cell 100. However, the first fuse device 40A may be electrically connected to an electronic equipment different from the battery cell 100. The same applies to the second fuse device 40B.

It is apparent that the present invention is not limited to the above embodiment, and may be modified and changed without departing from the scope and spirit of the invention.

What is claimed is:

1. A battery module comprising:
a plurality of battery cells, each of the plurality of battery cells including a positive electrode lead and a negative electrode lead, and
a voltage detection device located on one side of the plurality of battery cells, wherein
at least one positive electrode lead of at least one battery cell and at least one negative electrode lead of at least another one battery cell are connected on the one side to form a lead portion,
the voltage detection device includes a voltage detection portion connected to the lead portion, a holding body holding the voltage detection portion, and an insulator provided at the holding body,
at least a portion of the insulator is located between a pair of lead portions including the lead portion, and
the lead portion includes a portion where the at least one positive electrode lead and the at least one negative electrode lead overlap each other.

2. The battery module according to claim 1, further comprising a housing body housing the plurality of battery cells, wherein
at least another portion of the insulator is located between the lead portion and at least a conductive portion of the housing body.

3. The battery module according to claim 1, wherein
the holding body includes a frame surrounding the lead portion and the voltage detection portion, and
the frame includes the insulator.

4. The battery module according to claim 1, wherein
a plurality of positive electrode leads of at least two battery cells and a plurality of negative electrode leads of at least another two battery cells are connected on the one side to form the lead portion.

5. The battery module according to claim 1, wherein
each of the plurality of battery cells includes a positive electrode, a negative electrode, a separator, an exterior material housing the positive electrode, the negative electrode, and the separator,
the positive electrode lead is electrically connected to the positive electrode and drawn from the exterior material, and
the negative electrode lead electrically connected to the negative electrode and drawn from the exterior material.

6. The battery module according to claim 1, wherein
the voltage detection portion and the portion of the lead portion overlap each other.

7. The battery module according to claim 1, wherein the at least one positive electrode lead and the at least one negative electrode lead are connected by laser welding.

8. The battery module according to claim 1, wherein the portion of the lead portion and the voltage detection portion are connected by laser welding.

9. The battery module according to claim 1, wherein the at least one positive electrode lead and the at least one negative electrode lead are directly connected to each other.

10. The battery module according to claim 1, wherein the portion of the lead portion and the voltage detection portion are directly connected to each other.

11. The battery module according to claim 1, wherein the at least one positive electrode lead and the at least one negative electrode lead are bonded to each other.

12. The battery module according to claim 1, wherein the portion of the lead portion and the voltage detection portion are bonded to each other.

13. A battery module comprising:
a plurality of battery cells, each of the plurality of battery cells including a positive electrode lead and a negative electrode lead, and
a voltage detection device located on one side of the plurality of battery cells, wherein
at least one positive electrode lead of at least one battery cell and at least one negative electrode lead of at least another one battery cell are connected on the one side to form a lead portion,
the voltage detection device includes a voltage detection portion connected to the lead portion, a holding body holding the voltage detection portion, and an insulator provided at the holding body,
at least a portion of the insulator is located between a pair of lead portions including the lead portion, and
the at least one positive electrode lead and the at least one negative electrode lead are connected by laser welding.

14. A battery module comprising:
a plurality of battery cells, each of the plurality of battery cells including a positive electrode lead and a negative electrode lead, and
a voltage detection device located on one side of the plurality of battery cells, wherein
at least one positive electrode lead of at least one battery cell and at least one negative electrode lead of at least another one battery cell are connected on the one side to form a lead portion,
the voltage detection device includes a voltage detection portion connected to the lead portion, a holding body holding the voltage detection portion, and an insulator provided at the holding body,
at least a portion of the insulator is located between a pair of lead portions including the lead portion, and
the at least one positive electrode lead and the at least one negative electrode lead are directly connected to each other.

15. A battery module comprising:
a plurality of battery cells, each of the plurality of battery cells including a positive electrode lead and a negative electrode lead, and
a voltage detection device located on one side of the plurality of battery cells, wherein
at least one positive electrode lead of at least one battery cell and at least one negative electrode lead of at least another one battery cell are connected on the one side to form a lead portion,
the voltage detection device includes a voltage detection portion connected to the lead portion, a holding body holding the voltage detection portion, and an insulator provided at the holding body,
at least a portion of the insulator is located between a pair of lead portions including the lead portion, and
the at least one positive electrode lead and the at least one negative electrode lead are bonded to each other.

16. The battery module according to claim 7, wherein the at least one positive electrode lead and the at least one negative electrode lead are directly connected to each other.

17. The battery module according to claim 7, wherein the at least one positive electrode lead and the at least one negative electrode lead are bonded to each other.

18. The battery module according to claim 16, wherein the at least one positive electrode lead and the at least one negative electrode lead are bonded to each other.

19. The battery module according to claim 13, wherein the at least one positive electrode lead and the at least one negative electrode lead are directly connected to each other.

20. The battery module according to claim 13, wherein the at least one positive electrode lead and the at least one negative electrode lead are bonded to each other.

* * * * *